United States Patent Office 2,895,855
Patented July 21, 1959

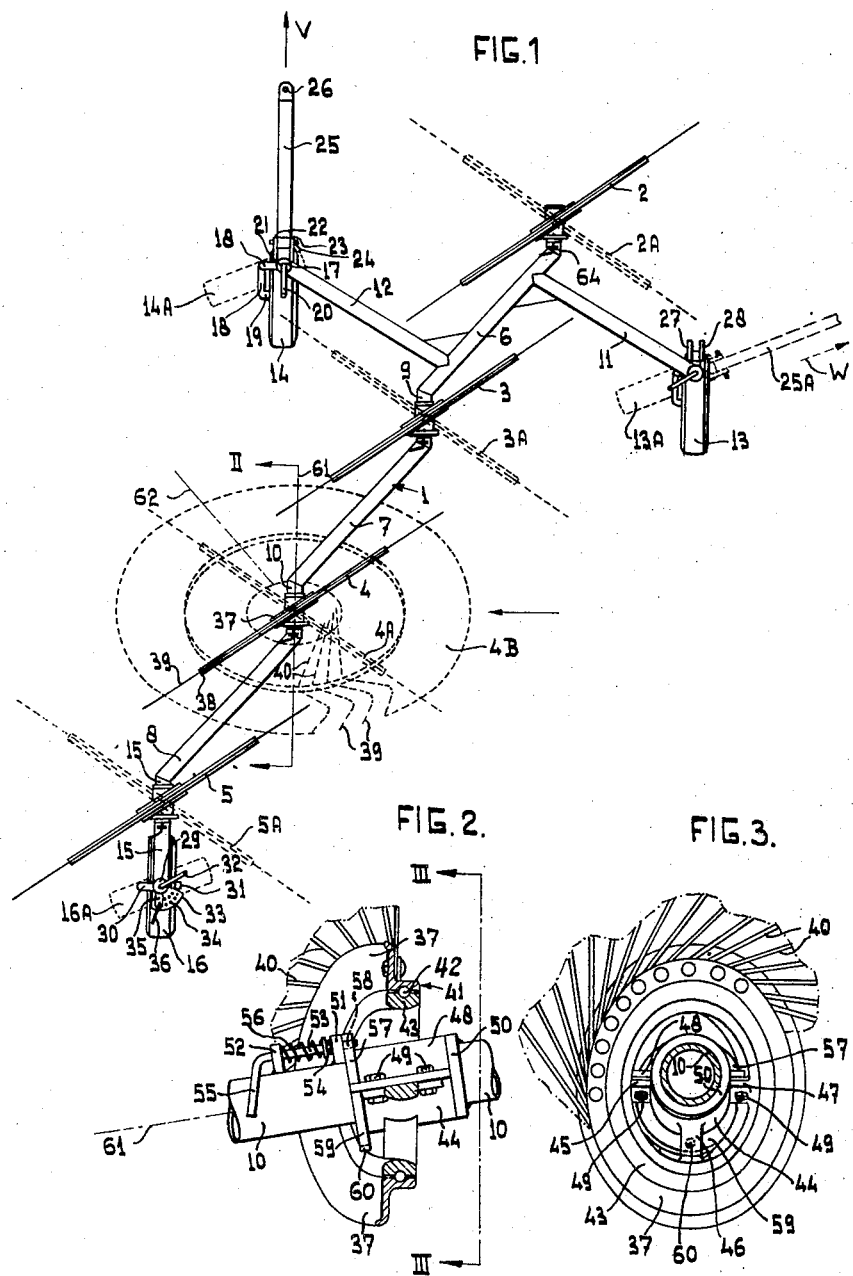

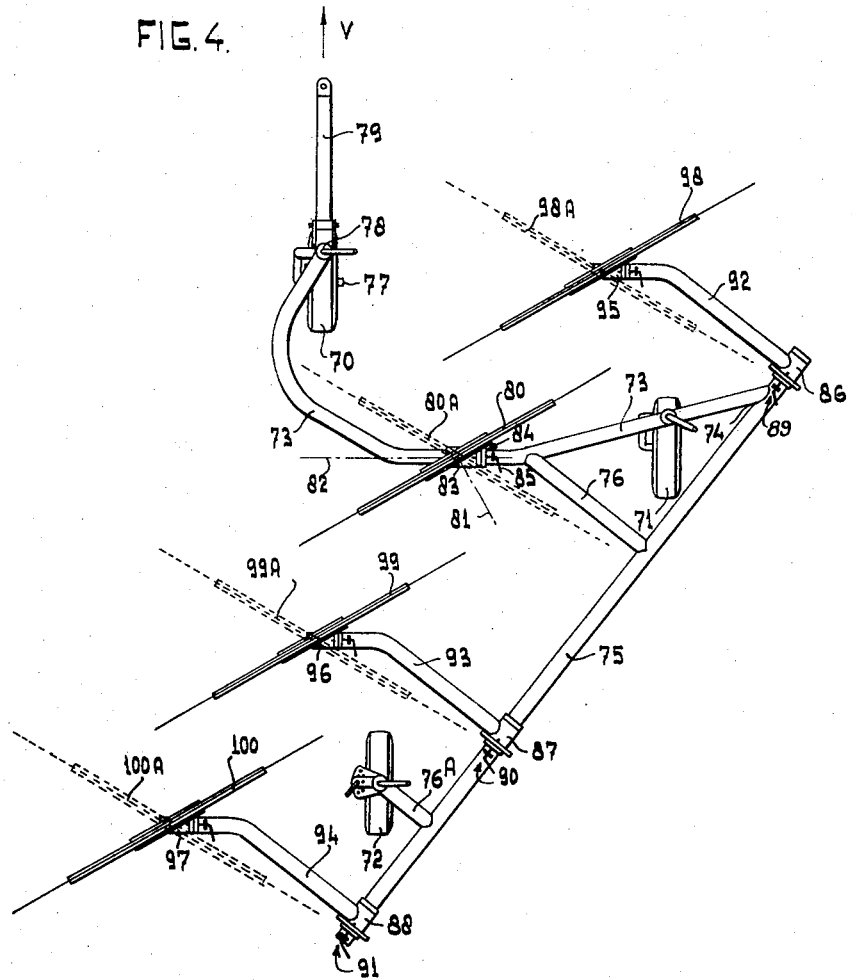

2,895,855

RAKING IMPLEMENT

Cornelis van der Lely and Ary van der Lely, Maasland, Netherlands, assignors to C. van der Lely N.V.

Application December 31, 1956, Serial No. 631,601

Claims priority, application Netherlands December 31, 1955

13 Claims. (Cl. 56—377)

This invention relates to agricultural implements, and more particularly to devices for laterally displacing crop lying on the ground.

Agricultural implements are known which may be employed for a single function and these devices operate as side delivery rakes, tedders, and so forth.

It is an object of the invention, however, to provide improved means whereby a single device can be operated to perform a multiplicity of functions.

The invention achieves its principal objective by the provision of a frame whereupon rake wheels are mounted for an eccentric type of rotation about an axis. This rotation about the axis may hereinafter be referred to as "tumbling" and the axis may be designated as the "tumbler axis" or by similar terms.

By tumbling a rake wheel about the tumble axis, the invention provides for at least two operable positions of the rake wheel as will be shown. Advantageously, there are positions intermediate these operating positions at which the rake wheel assumes a position of rest. Therefore, it is a further advantage of the invention that, in providing for various operating conditions, further conditions become available which are suitable for the storing and transporting of the associated device.

Figure 5:
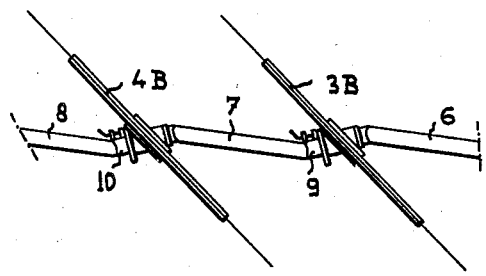
Figure 6:
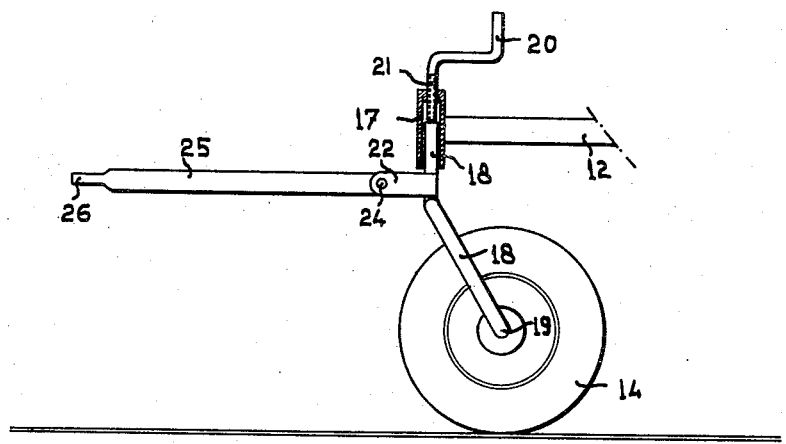

In the following detailed description, the invention is more particularly explained with reference to the accompanying drawings in which:

Fig. 1 shows a side delivery rake which, in accordance with the invention, can be manipulated to operate as a tedder, Fig. 2 is an enlarged vertical sectional view of a rake wheel of Fig. 1, taken above the tumble axis of this rake wheel according to line II—II in Fig. 1, Fig. 3 is a further vertical sectional view of the rake wheel taken according to line III—III in Fig. 2, Fig. 4 illustrates another side delivery rake which also can be changed into a tedder, Fig. 5 is a partial side view of a device, in accordance with the invention, illustrating the rake wheels placed in a transport position, and Fig. 6 is a side view of one of the wheels of the rake by means of which the rake is rendered mobile.

The side delivery rake shown in Fig. 1 includes a frame (generally designated) 1 carrying four rake wheels 2, 3, 4, and 5. The part of the frame between the rake wheels 2 and 3 consists of a tubular portion 6 whereas tubular portions 7 and 8 of the frame are positioned between the rake wheels 3 and 4, and the rake wheels 4 and 5, respectively. The tubular portions 6 and 7 are connected by a tubular portion 9 with tubular portions 7 and 8 being connected by the tubular portion 10.

Toward the front end of the tubular portion 6 is fixed an arm 11 extending toward the right and rearwardly (considering arrow V which indicates the direction of travel of the rake) and to the back of the tube 6 is connected an arm 12 extending toward the left and front. The free extremities of the arms 11 and 12 are each provided with a swivel wheel which is adjustable in height (as will be explained) and the arms 11 and 12 are provided with running wheels 13 and 14, respectively. The rearmost end of the tube 8 is connected to a tubular portion 15, the rearmost end of which is located behind the rake wheel 5 and carries an adjustable running wheel 16.

The running wheels 13 and 14 are identically mounted in the manner hereinafter described with reference to the running wheel 14. The arm 12 (shown also in Fig. 6) carries a vertical tube 17 in which the upper end of a vertical rod 18 is freely rotatable. The lower end of the rod 18 is coupled to the axle 19 of the running wheel 14. A threaded spindle 21, provided with a crank 20 for manual operation, is vertically adjustable in a threaded aperture provided in the upper end of the vertical tube 17. As a result, the length of the lower end of the spindle 21 extending into the tube 17 can be adjusted and, as the upper end of the rod 18 rests against the lower end of the spindle 21, the height of the running wheel 14 is adjustable with regard to the frame 1.

To the rod 18 are fixed the horizontal legs 22 and 23 of a fork. The legs 22 and 23 are provided with apertures (not shown) for accommodating a horizontal pin 24 which constitutes a hinge axle for a draw arm 25. At the front 26 of the draw arm 25, a tractive force can be exerted to move the side delivery rake in the direction of the arrow V over a field. Due to the coupling of the arm 25 to the rod 18, the position of the draw arm 25 determines the position of the running wheel 14 so that the running wheel 14, although being constructed as a swivel wheel, does not act as a swivel wheel during the pulling of the rake. The running wheel 13 is similarly provided with legs 27 and 28 of a fork, the legs 27 and 28 corresponding to the legs 22 and 23 of the running wheel 14. The legs 27 and 28 are also provided with apertures (not shown) to accommodate a pin and the pin 24 can be removed from the legs 22 and 23 so that the arm 25 can be removed for repositioning between the legs 27 and 28 where it is hingedly connected by means of the pin 24. With this alteration, designed to convert the side delivery rake into a tedder, the running wheel 14 operates as a swivel wheel whereas the position of the running wheel 13 is determined by the draw arm 25.

The rear end of tubular portion 15 supports a vertical tube 29 in the lower end of which rotates the vertical upper end of a rod 30. The lower end of the rod 30 carries the horizontal axle 31 of the running wheel 16 and the height of the running wheel 16 with regard to the frame 1 can be adjusted by means of the crank 32. This adjustment may be effected in the same way as described with reference to running wheel 14.

A disc sector 33 is fixed to the rod 30 and is provided with apertures 34. Above sector 33, a perforated lip 35 is fixed to the tube 29. A locking pin or device 36 can be inserted through the lip 35 and into one of the apertures 34 to maintain the running wheel 16 in various positions two of which are shown in Fig. 1 by solid and dotted lines. The position 16A which is shown in Fig. 1 by dotted lines is used during the teddering operation.

The rake wheels 2, 3, 4 and 5 are all of the same construction and are supported in the same manner. This construction is, therefore, more fully described by way of example only for one rake wheel, namely the rake wheel 4. As shown in Figs. 1 and 2, the rake wheel 4 consists of a hub 37, a rim 38, tines 39 and spokes 40 formed by integral extensions of the latter. The spokes 39 are fixed to the hub 37 and extend through apertures in the rim 38. Those portions of the spokes which extend out of the rim 38 form the tines 39.

The hub 37 forms part of a bearing, specifically the outer ring of a ball-bearing race having balls 42 and an inner ring 43 and designated generally as the bearing 41 and referred to hereinafter as the "second bearing member." The inner ring 43 (see also Fig. 3) is integral with a bearing portion 44 to which the ring 43 is connected by means of arms 45, 46 and 47. A bearing portion 48 can be connected to the bearing portion 44 by means of bolts 49 to constitute a bearing for the tubular portion 10 which is hereinafter referred to as the "first bearing member."

To prevent an axial displacement of the tubular portion 10 to the left in the bearing formed by the portions 44 and 48, a ring 50 is fixed to tubular portion 10. A lip 51 welded to the tube 10 at the other side of the bearing portions 44 and 48 prevents a displacement of the tubular portion 10 to the right. Near the lip 51, a second lip 52 is fixed to the tube 10. The lips 51 and 52 are perforated and a locking pin 53, to which a ring 54 is fixed and which is provided with a bent extremity 55; the pin 53 passes through the apertures in the lips 51 and 52. Between the ring 54 and the lip 52, a helical spring 56 is mounted around the pin 53.

The bearing portion 48 is provided with a collar 57 having an aperture 58 through which the pin 53 passes to locate the bearing formed by the portions 44 and 48 in the illustrated position. The bearing portion 44 supports a collar 59 which is provided with an aperture 60 which is also adapted to receive pin 53 and due to which it is possible to alternately lock the bearing portions 44 and 48 in positions which are rotated through an angle of 180° about the center line of the tubular portion 10. This adjustment causes the rake wheel 4 to assume the position illustrated by dotted lines in Fig. 1 due to the angular disposition of the axis of rotation of the bearing 44, 48 with regard to the axis of rotation of the rake wheel defined by the axis of bearing 41. Similarly, rake wheels 2, 3 and 5 can be brought to positions 2A, 3A and 5A as shown by dotted lines in Fig. 1. In other words, since the plane of each rake wheel is at an angle to its bearing, a displacement of the bearing causes the plane of the rake to change relative positions.

In the position indicated by solid lines in Fig. 1, the device described constitutes a side delivery rake which can be pulled by a tractor or a draft animal, and which displaces material encountered on a field toward the left and ultimately off the trailing edge of the rake wheel 5 onto a swath. The device can be converted into a tedder by simply detaching the draw arm 25 from the running wheel 14 as previously described and connecting the arm 25 to the running wheel 13 and also fixing the running wheel 16 in position 16A while the rake wheels 2, 3, 4 and 5 are brought into positions 2A, 3A, 4A and 5A, respectively. During operation, the forces exerted on the arm 25 will cause it to immediately take position 25A indicated in Fig. 1 by dotted lines; and the running wheels 13 and 14 will assume positions 13A and 14A parallel to the running wheel 16 in position 16A. The device thus works as a tedder for, during movement in the direction of arrow W, the rake wheels 2A, 3A, 4A and 5A work the crop along narrow strips of land, the wheels working independently of one another.

In Fig. 1 the rake wheel 4 may also be disposed in a third position 4B. The rake wheel 4 passes through the position 4B during the change from position 4 to position 4A since the bearing portions 44 and 48, for example, are rotated through an angle of 180° and the position 4B may be maintained by engagement of pin 53 in a suitable aperture of the bearing 44, 48. As the plane of rotation of the rake wheel in position 4B is angularly disposed with respect to a vertical plane, the lowermost point of the wheel is located an appreciable distance above the ground, as shown in Fig. 5. Thus, position 4B is very suitable for moving the device without working a crop such as, for example, when the device is travelling over roads.

As appears from Fig. 1 (see the rake wheel 4 in the position 4B), the tines 39 are placed with their extremities in the wheel plane at an angle with respect to radial directions. Advantageously, with this arrangement, the crop at the rearmost end of the wheel (where the tines move upwards with their extremities directed downwards) can easily drop from the tines and will not be carried along toward the front and over the wheel. It is preferred that both when the device is displaced in the direction V as a side delivery rake and when the device, as a swarth turner, is displaced in the direction W, the tines of the rake wheels which move upwards are directed downwards.

It is to be observed that the center line 61 of the tubular portion 10 (Fig. 2) which center line forms the center line of the frame at the hub 37 of the rake wheel 4, coincides with the tumble axis about which the axis of rotation 62 (Fig. 1) of the rake wheel 4 tumbles when the bearing portions 44 and 48 rotate about the tube 10. It is evident that the axis of rotation 62 being considered is an imaginary axis defined by the bearing 41 which although not actually formed in the structure is readily determined for purpose of reference.

In the embodiment shown in Fig. 4, the device is supported by three running wheels 70, 71 and 72. The running wheels 70 and 71 are adjustable as to height with regard to the frame and support a member 73 of the frame which near its extremity 74 is connected to a rod 75. A strut 76 reinforces this connection.

The running wheel 72 carries, by means of a short arm 76A connected to the rod 75, the rearmost end of the rod 75. The running wheel 72 is an adjustable running wheel fixable in determinable directions and of a construction similar to that of the running wheel 16 in Fig. 1. The running wheel 71 is a swivel wheel of a construction like the running wheel 13 in Fig. 1. Further, the axis 77 of the running wheel 70 can revolve about the vertical axis 78, the position of the running wheel 70 being determined by the position of the draw arm 79, due to which the device can be moved in the direction V. The construction of this running wheel is comparable with that of the running wheel 14 in Fig. 1; however, the arm 79 is not displaced to another running wheel for converting the device from one operation to another.

The member 73 is provided with a rake wheel 80 which can freely rotate about its movable axis of rotation 81. The axis 81 is angularly displaced with respect to, and can tumble about, a tumble axis 82 which coincides with the center line of the member 73 at the tubular portion of the latter to which is coupled the rake wheel 80 by means of a bushing 83 which forms a bearing and is rotatable about the member 73. The bushing 83 can be fixed in two positions spaced by an angle of 180°, in which positions the plane of the rake wheel 80 is vertical, by means of a locking device 84 provided with a locking pin 85. This locking device is of the same construction as the locking device of Fig. 2. Moreover, to provide a transport position, the bushing 83 can also be fixed by the device 84 in the position in which the axes 81 and 82 lie in one vertical plane.

The rod 75 carries three bushings or bearings 86, 87, and 88, which each are rotatable about the center line of the rod 75 and which can be fixed in different angular positions by locking devices 89, 90 and 91 which are of the same construction as the locking device 84. To the bushings 86, 87 and 88, arms 92, 93 and 94 are respectively fixed. The free extremities of these arms carry bushings or bearings (first bearings) 95, 96 and 97 the center lines of which are parallel to the tumble axis 82 of the rake wheel 80. These bushings are rotatable about these center lines which define the respective tumble axes and are fixable in the manner of bushing 83. On the bushings 95, 96 and 97 rake wheels 98, 99 and 100 are mounted by suitable bearings (second bearings) in the same way as the rake wheel 80 is mounted on the bushing 83.

In the working position of Fig. 4 in which the device works as a side delivery rake, the rake wheels 98, 80, 99 and 100 are in the position shown by solid lines and are at the same height. The device can be changed into a tedder by placing the rake wheels 98, 80, 99 and 100 in positions 98A, 80A, 99A and 100A which are shown by dotted lines. This is simply achieved by turning the bushings 95, 83, 96 and 97 through an angle of 180°.

It will be observed that the tines of the rake wheels, which are of the same construction as described in connection with the Figs. 1 and 2, maintain a favorable position with regard to the travelling direction V after the tumbling of the rake wheels. Their positions change little which is a result of the fact that the tumble axes are substantially transverse to the travelling direction V.

For the benefit of facilitating transportation of the device, the rake wheels can be placed in intermediate positions in which their planes define angles with vertical planes.

It may be desirable to work with only some of the rake wheels such as, for example, with the rake wheels 98, 80 and 99, or with the rake wheels 80 and 100 in positions 80A and 100A. The rake wheels which are to be inactive cannot be rendered inactive by bringing them to the transport position as in this recumbent position they would disturb adjacent rake wheels which are operating. However, the eliminating the action of these wheels can be obtained by rotating one or more of the arms 92, 93 and 94 upwards, for example, through an angle of 45°-90° and by fixing the upwardly turned arm in the new position.

In the illustrated embodiments of the invention, the axis of rotation of each rake wheel and the related tumble axis preferably enclose an angle of more than 10 degrees, while each tumble axis is inclined from a vertical plane by an angle of more than 45 degrees and from a horizontal plane by an angle of 5 to 30 degrees.

There will now be obvious to those skilled in the art many modifications of the structure set forth but which do not depart essentially from the spirit of the invention as defined in the following claims.

What we claim is:

1. A device for laterally displacing a crop lying on the ground comprising a frame member, a bearing defining an axis of rotation and selectively rotatable on said frame member and a rake wheel rotatably mounted on said bearing at an acute angle to the axis of rotation of said bearing whereby selective rotation of the bearing controls the positioning of the rake wheel.

2. A device as claimed in claim 1 comprising a locking device on the frame member and operatively associated with said bearing to fix the latter in position.

3. A device as claimed in claim 1 wherein the rake wheel is vertical in at least two positions of rotation of said bearing.

4. A device as claimed in claim 1 where the rake wheel is inclined relative to the horizontal in at least one position of rotation of said bearing.

5. A device as claimed in claim 1 comprising a hub coupling said rake wheel to said bearing.

6. A device as claimed in claim 1 comprising a ball-bearing race including an outer ring coupled to said rake wheel and an inner ring on said bearing.

7. A device as claimed in claim 1 comprising means on the frame member for restricting axial displacement of said bearing.

8. A device as claimed in claim 1 comprising perforated lips on the frame member, a perforated collar on the bearing, and a locking insertable through the lips and collar for preventing rotation of the bearing.

9. A device as claimed in claim 1 wherein the bearing includes separate portions and means for adjustably connecting the portions.

10. A raking implement comprising a frame member, a plurality of bearings defining respective axes of rotation and each being selectively rotatable on the frame member, and rake wheels rotatably mounted on said bearings at acute angles to the axes of rotation thereof, the selective rotation of the bearings controlling the positioning of said wheels.

11. An implement as claimed in claim 10 wherein the bearings define parallel axes of rotation.

12. An implement as claimed in claim 10 comprising wheels on the frame member and supporting the same for ground traversing movement.

13. An implement as claimed in claim 10 comprising a draw arm coupled to the frame member.

References Cited in the file of this patent

UNITED STATES PATENTS

| | | |
|---|---|---|
| 2,459,961 | Pollard | Jan. 25, 1949 |
| 2,603,053 | Lipe et al. | July 15, 1952 |
| 2,706,032 | Kowalik | Apr. 12, 1955 |